July 12, 1966 K. S. LION 3,260,935
TRANSDUCER BRIDGE CIRCUIT UTILIZING STAGGER TUNED RESONANT
CIRCUITS TO OBTAIN A LINEAR D.C. OUTPUT WITH
A CHANGING INPUT FREQUENCY
Filed Dec. 10, 1962

KURT S. LION
INVENTOR.

BY Rines and Rines
ATTORNEYS

United States Patent Office 3,260,935

Patented July 12, 1966

3,260,935

TRANSDUCER BRIDGE CIRCUIT UTILIZING STAGGER TUNED RESONANT CIRCUITS TO OBTAIN A LINEAR D.C. OUTPUT WITH A CHANGING INPUT FREQUENCY

Kurt S. Lion, 9 Herbert Road, Belmont, Mass.

Filed Dec. 10, 1962, Ser. No. 243,353
7 Claims. (Cl. 324—57)

The present invention relates to transducers for converting changes of impedance into electrical voltage or current indications and, more particularly, to electrical bridge circuits driven by alternating, varying or pulsating-current voltage sources, hereinafter generically referred to as alternating-current voltage sources, and adapted to provide an output voltage of varying D.C. level, hereinafter referred to as direct-current output voltage.

Transducers of this type are described in my prior United States Letters Patent No. 3,012,192, issued December 5, 1961; but the present invention is specifically concerned with a novel mode of operation of similar circuits in accordance with which substantial independence of output voltage is attained with variation in frequency of the alternating-current source, over rather wide ranges, through the introduction of resonant tank circuits in the bridge arms in a particular location and condition of tuning adjustment.

A further object of the invention is to provide a novel bridge circuit that is not only substantially independent of driving frequency variation over substantial limits, but retains high sensitivity to impedance variations in the bridge arms and with each of the driving source, the variable impedance elements of the bridge arms and the direct-current output circuit commonly grounded and thus void of the deleterious and spurious effects of prior-art bridge circuits wherein all such elements cannot be grounded.

Still another object is to provide a novel bridge circuit of more general utility, as well.

Other and further objects will be hereinafter described and delineated in the appended claims.

Figure 1:
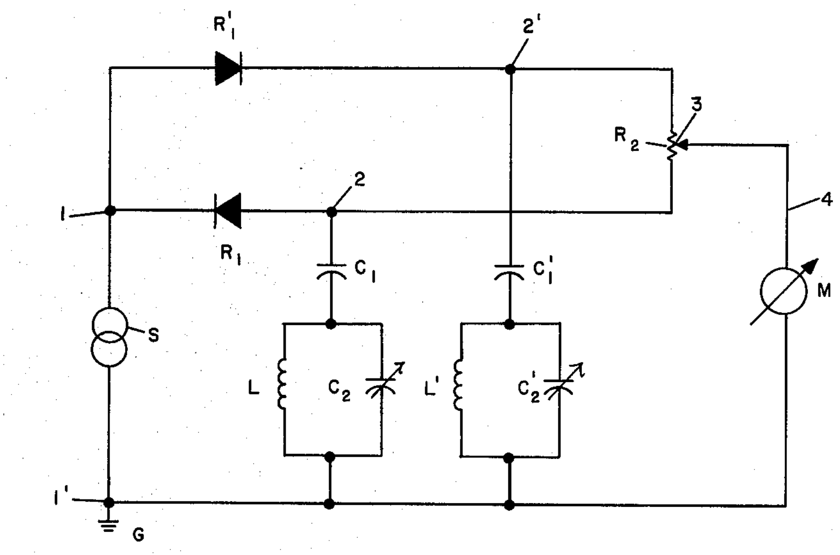
Figure 2:
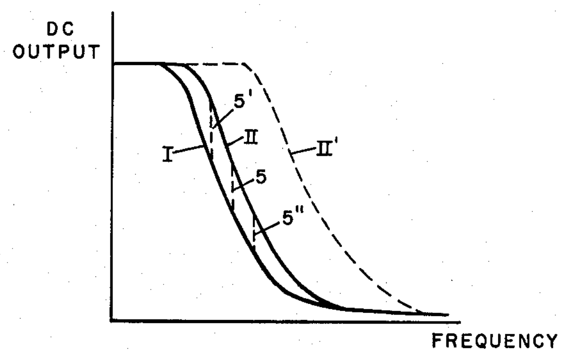

The invention will now be described in connection with the accompanying drawing, FIG. 1 of which is a circuit diagram embodying the invention in preferred form; and FIG. 2 is a graph illustrating the performance of the circuit of FIG. 1.

Referring to FIG. 1, the alternating current source S of any convenient low or high-frequency type, as described in the said Letters Patent, may be connected to the input terminals 1, 1′ of the bridge, the latter of which is grounded at G. The term "ground" as herein employed is intended to embrace not only actual earthing, but chassis or other reference potential, as well.

A first branch circuit comprising series-connected rectifier $R_1$, D.C. blocking capacitor $C_1$ and tank-circuit L–$C_2$ is connected between the input terminals 1, 1′, with the tank circuit and its variable capacitor $C_2$ grounded. A similar second branch circuit comprising oppositely poled rectifier $R_1'$, series-connected with D.C. blocking capacitor $C_1'$ and tank circuit L′–$C_2'$, is connected in parallel with the first branch circuit between input terminal 1 and the ground terminal 1′–G. The right-hand terminals 2 and 2′ of the retcifiers $R_1$ and $R_1'$ are connected in circuit with one another through resistance $R_2$ from an intermediate tap or point 3 of which (that may be substantially a resistance center tap for some circuit adjustments where similar branch-circuit components are employed) the output circuit 4 is connected. The output circuit 4 is shown continuing through a load device, such as a direct-current voltage indicator M of any desired type, to the common ground terminal G.

The tuning adjustment or resonating of the tank-circuit L–$C_2$, for example, to substantially the frequency of the source S (or a fractional or integer multiple thereof for somewhat less desirable operation), has been found to result in a direct-current voltage output versus frequency response as shown at I in FIG. 2, having a steep linear central characteristic. Tuning the other branch-tank circuit to substantially the same frequency, say slightly higher (or lower), will result in a slightly displaced similar response II. The resultant of these responses is the difference between these characteristic curves I and II which will be observed to produce substantially equal voltage differences, represented by the substantially equal-length dotted vertical lines 5, 5′, 5″, for variations of the frequency of the source S. Thus the advantage of substantial independence of resultant direct-current output voltage with frequency variation of the source S results. Note, however, that variation of $C_2$ or $C_2'$, as effected in response to some signal-controlled device, for example, such as pressure or strain gauges or the like, and which is to be transduced into an electrical output signal, produces a sensitive decided change in output voltage as represented by the illustrative dotted response curve II′. Thus changes of $C_2$ and/or $C_2'$ will shift the response curve to the right or left, producing sizable direct-current output voltage signals.

As an example, these results have been successfully obtained with a 300-kilocycle source S of about 25 volts R.M.S., silicon diode rectifiers $R_1$, $R_1'$ of the Hughes type 626, D.C. blocking capacitors $C_1$ and $C_1'$ of about 0.001 $\mu$farad, and L–$C_2$, L–$C_2'$ circuits the variable capacitors $C_2$ and $C_2'$ of which are much smaller, being variable from about 10 to 60 $\mu\mu$farads. With a total resistance $R_2$ of about 300K ohms, a vacuum tube direct-current voltmeter M indicated output voltages up to $\pm 1\frac{1}{2}$ volts as the capacitors $C_2$ and/or $C_2'$ were varied.

Clearly, other types of rectifiers may be employed and tuning may be effected, though less desirably, by variation of the elements L and L′. Further modifications will also occur to those skilled in the art and all such are consired to fall within the spirit and scope of the invention as defined in the appended claims.

What is claimed is:

1. A transducer bridge having, in combination, a pair of input terminals, one of which is grounded and between which an alternating-current voltage source of predetermined frequency is connected, a pair of branch circuits each connected between the input terminals and each comprising a rectifier connected at one terminal thereof in series circuit with direct-current blocking capacitance and a tank circuit of variable capacitance, the variation of which may be transduced into electrical variations, a further circuit series connecting the said one terminals of the rectifiers together, and a direct-current voltage output circuit connected between the further circuit and ground, the said tank circuits being tuned to resonate at about the said predetermined frequency or multiples thereof.

2. A transducer bridge as claimed in claim 1 and in which the rectifiers in the branch circuits are oppositely poled.

3. A transducer bridge as claimed in claim 2 and in which the tank circuits are connected to ground.

4. A transducer bridge as claimed in claim 1 and in which the said further circuit comprises resistance from an intermediate point of which the output circuit is connected to ground.

5. A transducer bridge as claimed in claim 4 and in which the output circuit comprises a direct-current voltage indicator.

6. A transducer bridge as claimed in claim 1 and in which the said blocking capacitance and the tank circuit variable capacitance are separate capacitors, the former of which is of value much larger than the value of the variable capacitor.

7. A transducer bridge as claimed in claim 1 and in which one of the tank circuits is adjusted for resonance at substantially the said predetermined frequency of the said source or a multiple thereof and the other tank circuit is adjusted to a frequency slightly displaced from said resonance.

References Cited by the Examiner

UNITED STATES PATENTS

| | | | |
|---|---|---|---|
| 2,243,417 | 5/1941 | Crosley | 329—141 |
| 2,312,070 | 2/1943 | Bliss | 329—141 |

WALTER L. CARLSON, *Primary Examiner.*

G. L. LETT, *Assistant Examiner.*